(12) United States Patent
Elliott et al.

(10) Patent No.: US 10,776,865 B2
(45) Date of Patent: Sep. 15, 2020

(54) METHOD AND APPARATUS FOR ATM-BASED CROSS-SELLING OF PRODUCTS AND SERVICES

(75) Inventors: Adam Joseph Elliott, Lino Lakes, MN (US); Barry Paul, Milwaukee, WI (US)

(73) Assignee: EFunds Corporation, Milwaukee, WI (US)

(*) Notice: Subject to any disclaimer, the term of this patent is extended or adjusted under 35 U.S.C. 154(b) by 789 days.

(21) Appl. No.: 12/857,205

(22) Filed: Aug. 16, 2010

(65) Prior Publication Data

US 2011/0060654 A1 Mar. 10, 2011
US 2015/0371325 A9 Dec. 24, 2015

Related U.S. Application Data

(63) Continuation of application No. 10/227,326, filed on Aug. 23, 2002, now abandoned, which is a continuation-in-part of application No. 09/653,595, filed on Aug. 31, 2000, now abandoned.

(60) Provisional application No. 60/168,272, filed on Dec. 1, 1999, provisional application No. 60/168,273, filed on Dec. 1, 1999, provisional application No. 60/168,276, filed on Dec. 1, 1999, provisional application No. 60/213,367, filed on Jun. 23, 2000.

(51) Int. Cl.
| | |
|---|---|
| *G07F 19/00* | (2006.01) |
| *G06Q 40/02* | (2012.01) |
| *G06Q 30/02* | (2012.01) |
| *G06Q 20/10* | (2012.01) |

(52) U.S. Cl.
CPC ........ *G06Q 40/025* (2013.01); *G06Q 20/10* (2013.01); *G06Q 20/1085* (2013.01); *G06Q 30/0255* (2013.01); *G06Q 30/0268* (2013.01); *G06Q 30/0269* (2013.01); *G06Q 30/0271* (2013.01); *G06Q 40/02* (2013.01); *G07F 19/20* (2013.01); *G07F 19/203* (2013.01)

(58) Field of Classification Search
CPC .................................................. G06Q 20/1085
USPC .......................................................... 705/43
See application file for complete search history.

(56) References Cited

U.S. PATENT DOCUMENTS

| | | |
|---|---|---|
| 4,815,741 A | 3/1989 | Small |
| 5,187,735 A | 2/1993 | Herrero Garcia et al. |
| 5,239,462 A | 8/1993 | Jones et al. |
| 5,262,941 A | 11/1993 | Saladin et al. |

(Continued)

OTHER PUBLICATIONS

Steven H. Pflaster, ATMs Poised to do more than just Dispense Money, www.bankrate.com, USA (no date indicated).

(Continued)

*Primary Examiner* — Elda G Milef
(74) *Attorney, Agent, or Firm* — Finnegan, Henderson, Farabow, Garrett & Dunner LLP (57) ABSTRACT

A method of and apparatus for automatically displaying an advertisement or promotional material to a user of an automated teller machine or point of purchase terminal. The method includes accessing debit data and credit bureau data for the applicant, accessing account information for the applicant, generating a score for the applicant based on the data and the account information and determining what advertisements or promotional offers to display on the ATM or POP terminal. The apparatus is a system, including both hardware and software components for effecting the method.

1 Claim, 3 Drawing Sheets

(56) References Cited

U.S. PATENT DOCUMENTS

| | | | |
|---|---|---|---|
| 5,387,783 A | | 2/1995 | Mihm et al. |
| 5,450,537 A | | 9/1995 | Hirai et al. |
| 5,473,143 A | | 12/1995 | Vak et al. |
| 5,611,052 A | | 3/1997 | Dykstra et al. |
| 5,619,558 A | * | 4/1997 | Jheeta ................ 379/92.01 |
| 5,696,907 A | | 12/1997 | Tom |
| 5,699,527 A | | 12/1997 | Davidson |
| 5,704,029 A | | 12/1997 | Wright, Jr. |
| 5,724,520 A | | 3/1998 | Goheen |
| 5,727,163 A | | 3/1998 | Bezos |
| 5,745,654 A | | 4/1998 | Titan |
| 5,761,640 A | | 6/1998 | Kalyanswamy et al. |
| 5,774,882 A | | 6/1998 | Keen et al. |
| 5,774,883 A | | 6/1998 | Andersen et al. |
| 5,797,133 A | | 8/1998 | Jones et al. |
| 5,819,029 A | | 10/1998 | Edwards et al. |
| 5,819,291 A | | 10/1998 | Haimowitz et al. |
| 5,832,465 A | | 11/1998 | Tom |
| 5,870,721 A | | 2/1999 | Norris |
| 5,870,724 A | | 2/1999 | Lawlor et al. |
| 5,878,403 A | | 3/1999 | DeFrancesco et al. |
| 5,911,135 A | | 6/1999 | Atkins |
| 5,930,764 A | * | 7/1999 | Melchione et al. ......... 705/7.29 |
| 5,930,776 A | | 7/1999 | Dykstra et al. |
| 5,940,811 A | | 8/1999 | Norris |
| 5,940,812 A | | 8/1999 | Tengel et al. |
| 5,950,179 A | | 9/1999 | Buchanan et al. |
| 5,960,411 A | | 9/1999 | Hartman et al. |
| 5,966,699 A | | 10/1999 | Zandi |
| 5,970,478 A | | 10/1999 | Walker et al. |
| 5,978,780 A | | 11/1999 | Watson |
| 5,987,434 A | | 11/1999 | Libman |
| 5,995,947 A | | 11/1999 | Fraser et al. |
| 6,000,832 A | | 12/1999 | Franklin et al. |
| 6,014,645 A | | 1/2000 | Cunningham |
| 6,029,149 A | | 2/2000 | Dykstra et al. |
| 6,029,890 A | | 2/2000 | Austin |
| 6,073,140 A | | 6/2000 | Morgan et al. |
| 6,088,686 A | * | 7/2000 | Walker et al. .................. 705/38 |
| 6,094,640 A | | 7/2000 | Goheen |
| 6,105,007 A | | 8/2000 | Norris |
| 6,112,190 A | | 8/2000 | Fletcher et al. |
| 6,119,103 A | | 9/2000 | Basch et al. |
| 6,260,758 B1 | | 7/2001 | Blumberg |
| 6,271,814 B1 | * | 8/2001 | Kaoh .............................. 345/82 |
| 6,280,325 B1 | | 8/2001 | Fisk |
| 6,324,524 B1 | | 11/2001 | Lent et al. |
| 6,349,290 B1 | | 2/2002 | Horowitz et al. |
| 7,039,600 B1 | * | 5/2006 | Meek et al. ............... 705/14.36 |
| 7,310,617 B1 | * | 12/2007 | Cunningham ................. 705/38 |
| 2002/0003162 A1 | * | 1/2002 | Ferber et al. .................... 235/14 |
| 2002/0024590 A1 | * | 2/2002 | Pena ..................... G06Q 20/04 |
| | | | 348/14.08 |

OTHER PUBLICATIONS

W.A. Lee, Debit Scores May Gauge Subprime Market, www.americanbanker.com, Feb. 28, 2002, USA.

Jay MacDonald, Coming soon to a street corner near you—Super ATMs, www.bankrate.com, USA (no date indicated).

Ed Vogel, Voting machines demonstrated, www.lvrj.com Jul. 20, 2001, USA.

Warren Richey, Technicians, lawmakers try to do away with chads, www.csmonitor.com, Mar. 23, 2001, USA.

Jay MacDonald, One day, you might vote at an ATM, www.bankrate.com, USA (no date indicated).

Cash Technologies Adds Voting Application to Its Emma Platform, www.cashtechnologies.com, Nov. 20, 2000, USA.

American Banker, Kantrow, Yvette D., "Banks Press Cardholders to Take Cash Advances," 1 page, vol. 157, No. 18, Jan. 28, 1992.

Anon., "To Boost Balances, AT&T Renews No-Fee Universal Card Offer, The Report on AT&T," vol. 10, No. 13, Mar. 30, 1992.

Anon., "Citgo Puts a New Spin on the Cobranded Oil Card," Credit Card News, p. 4, Nov. 1, 1995.

Medical Economics, Chesanow, Neil, "Pick the Right Credit Cards—and Use Them Wisely," p. 94, vol. 75, No. 16, Aug. 24, 1998.

P.R. Newswire Assoc., Inc., "Phillips 66 Introduces Mastercard With Rebate Feature," 1 page, Sep. 14, 1995.

American Banker, Block, Valerie, "Network Assembles Card Issuers At an Internet Site," p. 11, vol. 160, No. 198, Oct. 13, 1995.

http://www.creditnet.com/consumers.html, Credit Card Network, U.S.A., 4 pages, date unknown.

List of Web pages from Altavista, http://www.altavista.com/cgi-bin/query?pg=q&stype=stext&sc=on&q=FICO&stq=10, 2 pages, Nov. 4, 1999.

http://www.sancap.com/cis/FICO%20SCORE.htm, "What Do FICO Credit Scores Mean to Me?," 3 pages, May 30, 1998.

http://www.aspenloan.com/FICOscore.htm, "What Is a FICO Score?," 1 page, Sep. 30, 1998.

http://www.houseloans.idis.com/fico.htm, "FICO," 1 page, Oct. 2, 1998.

Computer Reseller News, Anon, "Microsoft Targets More Than Pim Market With Outlook 2000," p. 99, No. 805, Aug. 31, 1998.

Bank Technology News, Borowsky, Mark, "The Neural Net: Predictor of Fraud or Victim of Hype?," p. 7, Sep. 1993.

Credit World, Friedland, Marc, "Credit Scoring Digs Deeper Into Data," pp. 19-23, May 1996, vol. 84, No. 5.

InfoWorld, Hollander, Geoffrey, "Sibling Tool Personator 3 Untangles File Formats," p. 102, Feb. 2, 1998, vol. 20, No. 5.

Lotus News Release: "Lotus Delivers Pre-Release of Lotus Notes 4.6 Client Provides Compelling New Integration with Internet Explorer," May 20, 1997.

American Banker, McCormick, Linda W., "Users of Credit Scoring Face Tough Rules on Notification," May 21, 1982.

Business Journal Serving Southern Tier, CNY, McShane, Peter K., "Got Financing?," p. 9, vol. 11, Issue 19, Sep. 15, 1997.

Credit Union Management, Stetenfeld, Beth, "Credit Scoring: Finding the Right Recipe," pp. 24-26, vol. 17, No. 11, Nov. 1994.

Changing Times, "What the Credit Bureau is Saying About You," p. 56, vol. 37, Jul. 1983.

Credit World, Canter, Ronald S., "Lender Beware-Federal Regulation of Consumer Credit," pp. 16-20, vol. 81, No. 5, May 1993.

Communication News, "On-Line System Approves Loans While Customer Waits," vol. 31, No. 9, Sep. 1994.

Bank Technology News, "Low-Rent Loan Officer in a Kiosk," p. 5, vol. 8, No. 2, Feb. 1995.

ABA Banking Journal, Duclaux, Denise, "A Check for $5,000, in Ten Minutes," p. 45, vol. 87, No. 8, Aug. 1995.

Cards International, "World Wide Web Enhances Customers' Choice," p. 9, No. 143, Nov. 1995.

Business Wire, "Wells Fargo Launches First Real-Time, Online Home Equity Credit Decision-Making Service," Jun. 1998.

Chicago Tribune, Handley, John, "Credit Review Lets the Numbers Do the Talking in Home Mortgage Game," Jul. 1998.

Interactive Week, Sherman, Lee, "Wells Fargo Writes a New Online Script," p. 29, vol. 5, No. 31, Aug. 1998.

http://fidata-inc.com, FIData, Inc. Press Release, Aug. 26, 1998.

San Francisco Business Times, Calvey, Mark, "Internet Gives Bankers a Snappy Comeback," p. 3, vol. 13, No. 5, Sep. 1998.

http://www.americanbanker.com., W. A. Lee, "Debit Scores May Gauge Subprime Market," Feb. 28, 2002.

Card News, "HNC Scores First Union Account," 3 pages, vol. 13, Issue 1, Jan. 19, 1998.

Credit Risk Management Report, "Lenders Turn to Aggregate Sites Online Market Starts to Emerge," 5 pages, vol. 8, Issue 12, Jun. 29, 1998.

List of web pages from DR-LINK, http://drlink.mnis.net/cgi-bin/index.cgi, 9 pages, Nov. 4, 1999.

Card News, "Outsourcer Technology Offers Instant Approval," 3 pages, Nov. 9, 1998.

Card News, Jordan, Meredith et al., "Appro Offers Lending Package," 2 pages, vol. 13, Jan. 19, 1998.

Dot.COM, "IBM Takes Financing into Cyberspace," 3 pages, vol. 4, Issue 12, Mar. 1, 1998.

(56) References Cited

OTHER PUBLICATIONS

Credit Risk Management Report, "Community Banks Get Some Internet Play," 5 pages, vol. 8, Issue 20, Oct. 19, 1998.
Company Info, http://www.nextcard.com/companyinfo.html, Date Unknown.
The Motley Fool, Wettlaufer, Dale, "The Boring Portfolio: Bank Radar: A Look at NextCard.com," http://www.nextcard.com/pa_moneyfool_4051999.html, Apr. 5, 1999.
Bloomberg.com, Moody, Emma, "Nextcard Increases Loans on Internet Cards by $1 Million Daily," http://www.nextcard.com/Bloombergarticle.html, Jun. 17, 1999.
Nikkei BP BizTech, Matsuda, Emi, "U.S. Emerging Business Review 1999 NextCard-Using Data Analysis to Find and Acquire the Best Customers," http://www.nextcard.com/NIKKEI3.html, Jul. 1999.
CBS Market Watch, Chervitz, Darrne, "IPO First Words: NextCard CEO Jeremy Lent," http://www.nextcard.com/CBS.html, Jun. 16, 1999.
Online Banking Report, "NextCard Advances the State-of-the-Art in Online Lending," http://www.nextcard.com/pa_obrreport.html, May 1998.
American Banker, "Bank of Boston Returns to Credit Card Business with Low-Rate Offering," p. 18, vol. CLX, No. 175, Sep. 12, 1995.
Money, Stark, Ellen, "Little-Known Card Facts That Can Cost You Plenty," p. 38, vol. 25, No. 9, Sep. 1996.
Brandweek, "Queen of the Citi," p. 22, vol. 36, No. 16, Apr. 17, 1995.
Credit Card Management, Frank, John N., "Platinum Panache," p. 24, vol. 9, No. 7, Oct. 1996.
U.S. News & World Report, Simons, John et al., "Long Term Teasers," p. 82, vol. 115, Issue 10, Sep. 13, 1993.
Bank Marketing, Morrall, Katherine, "Marketing Credit Cards: Offers You Can't Refuse," p. 27, vol. 26, Issue 9, Sep. 1994.
http://consumers.creditnet.com/ Mar. 20, 2001.
List of web pages from DR-LINK, http://drlink.mnis.net/egi-bin/index.cgi, 8 pages, Nov. 8, 1999.
Newly launched CreditCardMenu.com Provides a Full Assortment of Credit Card Choices for Consumers, http://www.creditcardmenu.com/ 2 pages, Mar. 22, 1999.
http://www.creditcardmenue.com/egi/credi, 2 pages Nov. 8, 1999.
The Washington Times, Rombel, Adam, "Net-ing the Best Credit Card; Web Gives Browser Fast, Easy Selection," 2 pages, Mar. 18, 1999.

\* cited by examiner

METHOD AND APPARATUS FOR ATM-BASED CROSS-SELLING OF PRODUCTS AND SERVICES

RELATED APPLICATIONS

This application is a continuation of, and claims priority to, U.S. non-provisional patent application Ser. No. 10/227,326, filed Aug. 23, 2002 (now abandoned), which is a continuation-in-part of, and claims priority to U.S. non-provisional patent application Ser. No. 09/653,595, entitled METHOD AND APPARATUS FOR EVALUATING A FINANCIAL ACCOUNT APPLICANT, filed on Aug. 31, 2000, which application claims the benefit under 35 U.S.C. § 119 of U.S. Provisional Application No. 60/168,272, entitled METHOD AND APPARATUS FOR USE IN ENTERING FINANCIAL DATA INTO AN ELECTRONIC DEVICE, filed on Dec. 1, 1999; U.S. Provisional Application No. 60/168,276, entitled METHOD AND APPARATUS FOR AN ELECTRONIC CHECK PAYMENT SYSTEM, filed on Dec. 1, 1999; U.S. Provisional Application No. 60/168,273, entitled METHOD AND APPARATUS FOR PROVIDING ONLINE FINANCIAL ACCOUNT SERVICES, filed on Dec. 1, 1999; and U.S. Provisional Application No. 60/213,367, entitled SOFTWARE PROGRAM, filed on Jun. 23, 2000. Each of which are Each application is hereby incorporated herein by reference.

BACKGROUND OF THE INVENTION

The invention relates to a system for evaluating applicants for financial accounts and particularly, to a method and apparatus for automatically analyzing the applicants' credit bureau data, financial account information and demographic data to evaluate the financial account applicants.

Known methods of evaluating financial account applicants do not take advantage of technological tools. In particular, when a financial institution receives from a potential customer an application for opening a financial account, a financial institution employee must first verify the applicant's identity, then call or contact electronically a credit reporting bureau to get credit rating information for the applicant, and then call or contact electronically an account verification system to get information relating to present and past financial institution accounts held in the name of the applicant. Based on this information, the employee must then make an independent decision whether the financial institution will open the account for the applicant and what kind of products or services to offer the applicant.

The lack of a centralized method and apparatus for conducting credit bureau and account information investigations as well as determining whether to offer the applicant the product or service in question creates a great deal of inconsistency within the financial institution in this decision making process. For example, different employees of the financial institution may evaluate the credit bureau data and account information differently. This could result in the financial institution accepting more risk than it actually deems desirable, or alternatively, turning away customers needlessly. Moreover, even if the applicant is accepted, the financial institution employee may not be aware of other products or services that the financial institution would like to offer to the customer, or may simply neglect to offer such products or services.

SUMMARY OF THE INVENTION

Accordingly, the invention provides a method and apparatus for automatically evaluating a financial account applicant. The apparatus that implements the method is a network or system of computers and software programs resident on the computers. The method includes verifying the identity of the applicant, accessing credit bureau data for the applicant, accessing account information for the applicant, generating a score for the applicant based on the credit bureau data and the account information, and determining whether to open the financial account based on the score. The score can be either a single composite score, or can amount to a number of scores, for example, one for the credit bureau data and another for the account information. In one embodiment of the invention, the method includes using the score or scores to determine which products and services of the financial institution should be offered to the applicant. For example, some applicants may only qualify for a basic checking and savings account, while other applicants may qualify for debit or credit cards for other products or services of the financial institution. These products or services are offered automatically by the system embodying the invention based on the score for the applicant. In another embodiment, the method includes the automatic retrieval and evaluation of demographic data relevant to the applicant.

By providing an automated method and apparatus for evaluating financial account applications, a financial institution can improve the consistency with which applications are evaluated, take advantage of cross-selling opportunities for different products and services of the financial institution on a more consistent basis, reduce the amount of employee time required to evaluate the applications, and be assured of having a consistent risk assessment for new account applications.

Other features and advantages of the invention are set forth in the following drawings, detailed description and claims.

DETAILED DESCRIPTION OF THE PREFERRED EMBODIMENT

Before one embodiment of the invention is explained in full detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including" and "comprising" and variations thereof herein is meant to encompass the items listed thereafter and equivalents thereof as well as additional items.

Figure 1:
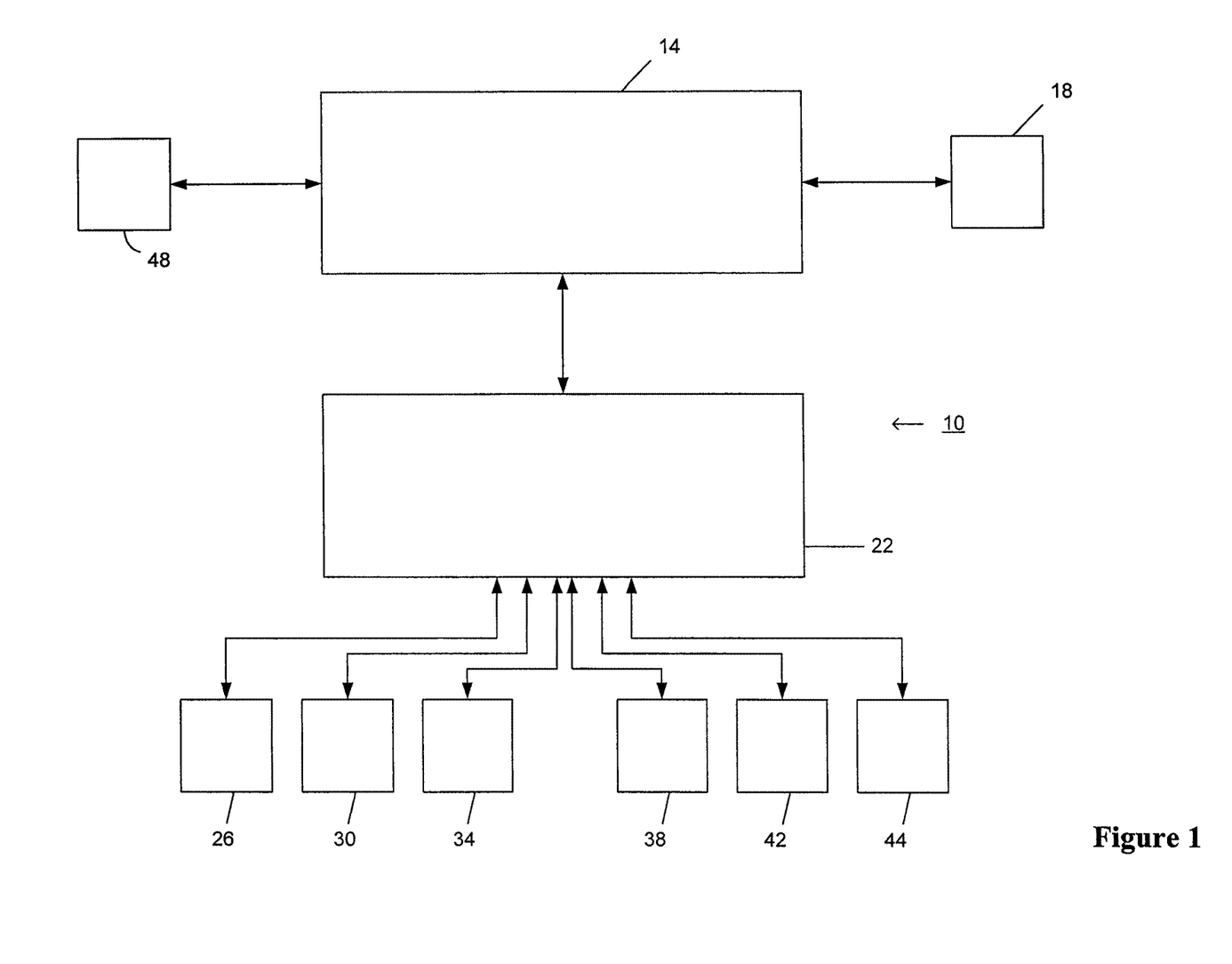
FIG. 1 is a schematic block diagram of a network embodying the invention.

Shown in FIG. 1 of the drawings is a network 10 for automatically evaluating a financial account applicant embodying the invention. One commercially operational example of a network embodying the invention is the Qualifile™ brand network and service operated and offered by eFunds Corporation of Milwaukee, Wis. In general terms, the network includes a gateway server 14 through which the financial institutions using the network are connected to the network. All connections shown in the figure denote two-way communication between the connected entities. A preliminary financial account search database 18 (such as the ChexSystems™ brand database offered by eFunds Corporation) is also connected to the gateway server 14.

The network also includes an application server 22 connected to the gateway server 14 and a plurality of application modules 26, 30, 34, 38, 42 and 44, connected to the application server 22. While many different application modules can be useful in the context of a network for automatically evaluating financial account applicants, the application modules shown in the figure include a customer set up module 26, a consumer search module 30, a financial account information data store module 34, a demographics database module 38, a credit bureau access module 42, and a scoring model module 44.

All of the elements of the network 10 are computer systems, including both hardware and software components, that are networked to effect the end result of automatically analyzing financial account information, credit bureau information and demographic information for the applicant, provide a score or scores to the financial institution that are relevant to the applicant, evaluate whether to accept the application and determine whether there are cross-selling opportunities for the financial institution to offer additional products and services to the applicant. While the network 10 is shown as including the gateway server 14, application server 22, preliminary search database 18 and application modules 26, 30, 34, 38, 42 and 44 as separate linked platforms, the entire network could be integrated into a single hardware/software platform which theoretically would reduce processing time, simplify the network architecture, and reduce cost associated with operating the system.

As shown in FIG. 1, the gateway server 14 provides an avenue for the financial institution 48 to communicate with the network 10, and for the network 10 to communicate with the financial institution 48. While only the single financial institution 48 is shown in the drawing, the system is intended to be accessed by many client financial institutions. In the preferred embodiment, the gateway server 14 is the Online Network Exchange ("ONE")™ brand networking system offered and operated by eFunds Corporation of Milwaukee, Wis. However, other computer hardware and software based networks can be substituted for the ONE brand computer network. Moreover, other portals can be created that allow direct connection of the financial institution 48 with the application server 22. For example, an Internet server (not shown) could be connected to the application server 22 so that any financial institution with access to the Internet could access the Internet server thereby opening a portal to the application server 22 over the Internet.

The preliminary financial account information database 18 is connected to the gateway server 14. The preliminary financial account database 18 allows a quick retrieval of financial account information based upon an applicant's last name, first name, social security number, and residence for the past five years. The database 18 is capable of retrieving information such as the frequency of new financial account applications made by the applicant within a given time period, and information relating to accounts that have been closed "for cause," such as for checks returned for non-sufficient funds ("NSF").

The customer setup data module 26 includes at least one workstation (not shown) for entering information that is specific to each participating financial institution 48. Specifically, each financial institution has a set of policy rules defined by the respective financial institution, that determine when the evaluation process would be terminated, e.g., if the results of the preliminary database search determine that the applicant had a previous financial account closed "for cause." Additionally, the customer setup data module workstation is used to input and store the criteria that the financial institution 48 uses to evaluate whether to accept the applicant, and also to establish what cross-selling products and services the financial institution 48 has and would be willing to offer to each applicant. Of course, workstations can be added as necessary to accommodate increased activity from the financial institution. When the financial institution account is established, each financial institution is provided with a security code that will grant the financial institution access to the network. The customer setup data module 26 also includes tax rate and billing data for each financial institution 48.

The consumer search module 30 is a database of links that "tie" together a collection of data bearing some relevance to the applicant, e.g., social security numbers that were issued at a given time or in a given place, etc. The applicant information, i.e., last name, first name, social security number, and place of residence for the last five years is entered into the consumer search module to find the link for the applicant, if one exists. While various databases are available that perform this function, the database of the preferred embodiment is offered by Acxiom Corporation of Conway, Ark. under the name Abilitec (at least a portion of which is described in U.S. Pat. No. 6,073,140, which is incorporated herein by reference). In another preferred embodiment of the invention (not shown), the network includes consumer search software providing database links that are internal to the application server, as well as an external consumer search module such as is provided by Acxiom Corporation and other companies to provide redundant linking capabilities.

The operational data store module 34 is a database that includes financial account and retail purchase history information such as previous account application inquiries for the applicant, financial account closures, information regarding retail items purchased and paid for, and check printing order histories. In other embodiments, the operational data store module can be expanded to comprehensively include the financial account information, retail purchase history, demographic information and credit bureau information. This would reduce the number of modules that the application server 22 must access in effecting the evaluation.

The interactive demographics database module 38 is a database of demographic information such as household income, home ownership status, education level, shopping practices, such as whether the applicant shops over the Internet, commonly purchased reading material, place of residence, marital status, etc. While there are many different and suitable demographic databases that can be used with the network, an appropriate demographics database is offered by Acxiom Corporation of Conway, Ark.

The network credit bureau access module 42 is simply a software based communication pathway to any one of the three major credit bureaus: Experian, Trans Union or Equifax. These credit bureaus provide a credit report which is acquired by the credit bureau access module 42 from the credit bureaus. The module 42 "packages" the report for the application server 22 and returns the repackaged report to the application server 22.

The scoring model module 44 includes software that takes either some all of the data acquired by the application server 22 and the modules 26, 30, 34, 38 and 42 connected thereto and provides a score or scores for each applicant based on an algorithm that defines a risk model. Preferably, the algorithm is a logistic regression algorithm that generates a score for each applicant which score predicts the likelihood that the applicant will be an account abuser. While various risk models or algorithms might be appropriate for use with the network 10, the algorithm of the preferred embodiment generates a score ranging between 900 (indicating that there is little risk to the financial institution) and 100 (indicating that there is a high risk to the financial institution). The risk model focuses on past and present account abuse. Specifically, those applicants whose scores are in approximately the lowest twenty (20) percent of the score range (i.e., approximately between 100 and 260) tend to have more unpaid NSF items on file with major retailers, have multiple financial account applications requested, have had at least one account closed for cause, have a less established or non-existent credit history, have one or more repossessed or charged-off trade lines, have one or more open trade lines that are thirty (30) to eighty (80) days delinquent, and/or have had more derogatory items than average over the past three years. The score or scores are returned to the application server for processing and comparison with the financial institutions' policy rules and guidelines.

In operation, the financial institution 14 contacts the administrator (not shown) of the network 10. The administrator sets up a participation account for each separate financial institution 48 using the workstation of the customer set up module 26. Upon creating the participant account, the financial institution 48 is issued a security code and provides to the network administrator a list of policy rules and a list of financial account application evaluation guidelines. The rules and guidelines may be selected from the list below and may be chosen in any combination.

DRIVER LICENSE INVALID FORMAT FOR STATE
DRIVER LICENSE NOT ON STATE FILE
DRIVER LICENSE DOB DOESN'T MATCH INQUIRY DOB
WARM ADDRESS FOUND
PHONE VALIDATION: INVALID PHONE #
PHONE VALIDATION: MOBILE PHONE #
PHONE VALIDATION: PAGER PHONE #
PHONE VALIDATION: SPECIAL PHONE #
PHONE VALIDATION: CELLULAR PHONE #
PHONE VALIDATION: TEST PHONE #
PHONE VALIDATION: CELLULAR, PAGER OR MOBILE PH #
PHONE VALIDATION: PERSONAL COMMUNICATION SERVICE
SSN/DOB: SSN AVAILABLE AT AGE VS. CURRENT AGE
SSN/DOB: SSN AVAILABLE BEFORE DATE OF BIRTH
SSN/DOB: SSN ISSUED WITHIN LAST 5 YEARS
PHONE/ZIP: PHONE NUMBER NOT IN ZIP CODE
NUMBER OF INQUIRIES IN THE LAST 30 DAYS
NUMBER OF INQUIRIES IN THE LAST 60 DAYS
NUMBER OF INQUIRIES IN THE LAST 90 DAYS
NUMBER OF INQUIRIES IN THE LAST 180 DAYS
NUMBER OF INQUIRIES IN THE LAST 1 YEAR
NUMBER OF DAYS SINCE MOST RECENT INQUIRY
NUMBER OF DAYS SINCE FIRST INQUIRY
AVERAGE NUMBER OF DAYS BETWEEN INQUIRIES IN THE PAST 1 YEAR
NUMBER OF INQUIRIES IN THE LAST 90 DAYS
NUMBER OF DIFFERENT MASTER BANKS POSTING INQUIRIES IN THE PAST 180 DAYS
NUMBER OF CHECK PRINTING ORDERS IN THE LAST 30 DAYS
NUMBER OF CHECK PRINTING ORDERS IN THE LAST 60 DAYS
NUMBER OF CHECK PRINTING ORDERS IN THE LAST 90 DAYS
NUMBER OF CHECK PRINTING ORDERS IN THE LAST 180 DAYS
NUMBER OF CHECK PRINTING ORDERS IN THE LAST YEAR
NUMBER OF CHECK PRINTING ORDERS IN THE LAST 2 YEARS
NUMBER OF CHECK PRINTING ORDERS IN THE LAST 3 YEARS
NUMBER OF DIFFERENT CHECK PRINTING ACCOUNTS
NUMBER OF DIFFERENT BANKS ORDERING CHECKS IN THE PAST 1 YEAR
NUMBER OF DAYS SINCE MOST RECENT CHECK PRINTING ORDER
NUMBER OF DAYS SINCE FIRST CHECK PRINTING ORDER
MINIMUM NUMBER OF DAYS BETWEEN ORDERING CHECKS IN THE PAST YEAR
NUMBER OF CHECKS ORDERED IN THE LAST 30 DAYS
NUMBER OF CHECKS ORDERED IN THE LAST 60 DAYS
NUMBER OF CHECKS ORDERED IN THE LAST 90 DAYS
NUMBER OF CHECKS ORDERED IN THE LAST 180 DAYS
NUMBER OF CHECKS ORDERED IN THE LAST 1 YEAR
NUMBER OF CHECKS ORDERED IN THE LAST 2 YEARS
NUMBER OF CHECKS ORDERED IN THE LAST 3 YEARS
MINIMUM NUMBER OF CHECKS ORDERED
MAXIMUM NUMBER OF CHECKS ORDERED
AVERAGE NUMBER OF CHECKS ORDERED
NUMBER OF OPEN RETAIL ITEMS IN THE LAST 30 DAYS
NUMBER OF OPEN RETAIL ITEMS IN THE LAST 60 DAYS
NUMBER OF OPEN RETAIL ITEMS IN THE LAST 90 DAYS
NUMBER OF OPEN RETAIL ITEMS IN THE LAST 180 DAYS
NUMBER OF OPEN RETAIL ITEMS IN THE LAST YEAR
NUMBER OF OPEN RETAIL ITEMS IN THE LAST 2 YEARS
NUMBER OF OPEN RETAIL ITEMS IN THE LAST 3 YEARS
TOTAL DOLLAR AMOUNT OF OPEN RETAIL ITEMS, IN THE LAST 30 DAYS
TOTAL DOLLAR AMOUNT OF OPEN RETAIL ITEMS IN THE LAST 60 DAYS
TOTAL DOLLAR AMOUNT OF OPEN RETAIL ITEMS IN THE LAST 90 DAYS
TOTAL DOLLAR AMOUNT OF OPEN RETAIL ITEMS, IN THE LAST 180 DAYS
TOTAL DOLLAR AMOUNT OF OPEN RETAIL ITEMS, IN THE LAST YEAR

TOTAL DOLLAR AMOUNT OF OPEN RETAIL ITEMS, IN THE LAST 2 YEARS
TOTAL DOLLAR AMOUNT OF OPEN RETAIL ITEMS, IN THE LAST 3 YEARS
NUMBER OF PAID RETAIL ITEMS IN THE LAST 30 DAYS
NUMBER OF PAID RETAIL ITEMS IN THE LAST 60 DAYS
NUMBER OF PAID RETAIL ITEMS IN THE LAST 90 DAYS
NUMBER OF PAID RETAIL ITEMS IN THE LAST 180 DAYS
NUMBER OF PAID RETAIL ITEMS IN THE LAST YEAR
NUMBER OF PAID RETAIL ITEMS IN THE LAST 2 YEARS
NUMBER OF PAID RETAIL ITEMS IN THE LAST 3 YEARS
TOTAL DOLLAR AMOUNT OF PAID RETAIL ITEMS, IN THE LAST 30 DAYS
TOTAL DOLLAR AMOUNT OF PAID RETAIL ITEMS, IN THE LAST 60 DAYS
TOTAL DOLLAR AMOUNT OF PAID RETAIL ITEMS, IN THE LAST 90 DAYS
TOTAL DOLLAR AMOUNT OF PAID RETAIL ITEMS, IN THE LAST 180 DAYS
TOTAL DOLLAR AMOUNT OF PAID RETAIL ITEMS, IN THE LAST YEAR
TOTAL DOLLAR AMOUNT OF PAID RETAIL ITEMS, IN THE LAST 2 YEARS
TOTAL DOLLAR AMOUNT OF PAID RETAIL ITEMS, IN THE LAST 3 YEARS
TOTAL (OPEN+PAID) NUMBER OF SCAN ITEMS IN THE PAST 1 YEAR
TOTAL (OPEN+PAID) NUMBER OF SCAN ITEMS IN THE PAST 3 YEARS
DAYS SINCE MOST RECENT OPEN RETAIL ITEM
DAYS SINCE MOST RECENT PAID RETAIL ITEM
MAXIMUM DOLLAR AMOUNT OF OPEN RETAIL ITEMS
MAXIMUM DOLLAR AMOUNT OF PAID RETAIL ITEMS
MINIMUM CHECK NUMBER ON OPEN RETAIL ITEMS
MINIMUM CHECK NUMBER ON PAID RETAIL ITEMS
MINIMUM DAYS TO PAY AN OPEN RETAIL ITEM
MAXIMUM DAYS TO PAY AN OPEN RETAIL ITEM
EPISODE SPAN OF ALL OPEN AND AID RETAIL ITEMS
CLOSURE FLAG: ZERO OR ONE CLOSURE IN THE LAST 30 DAYS
CLOSURE FLAG: ZERO OR ONE CLOSURE IN THE LAST 60 DAYS
CLOSURE FLAG: ZERO OR ONE CLOSURE IN THE LAST 180 DAYS
CLOSURE FLAG: ZERO OR ONE CLOSURE IN THE LAST YEAR
CLOSURE FLAG: ZERO OR ONE CLOSURE IN THE LAST 2 YEARS
CLOSURE FLAG: ZERO OR ONE CLOSURE IN THE LAST 3 YEARS
CLOSURE FLAG: ZERO OR ONE CLOSURE IN THE LAST 5 YEARS
FRAUD CLOSURE FLAG
DAYS SINCE MOST RECENT CLOSURE
DAYS SINCE FIRST CLOSURE
AVERAGE NUMBER OF DAYS BETWEEN CLOSURES
PRESENCE OF ONE OR MORE OPEN RETAIL ITEMS OVER THE PAST 3 YEARS
TOTAL NUMBER OF INQUIRIES IN THE PAST 12 MONTHS
PRESENCE OF ONE OR TWO CHECK ORDERS FROM DIFFERENT FINANCIAL INSTITUTIONS IN THE LAST YEAR
PRESENCE OF ONE RETAIL ITEM IN THE PAST 3 YEARS
PRESENCE OF TWO OR THREE RETAIL ITEMS IN THE PAST 3 YEARS
PRESENCE OF FOUR OR MORE RETAIL ITEMS IN THE PAST 3 YEARS
PRESENCE OF ONE CLOSURE IN THE PAST 6 MONTHS
PRESENCE OF ONE CLOSURE, 6 MONTHS TO 5 YEARS AGO
TOTAL NUMBER OF INQUIRIES FROM DIFFERENT FINANCIAL INSTITUTIONS IN THE LAST 6 MONTHS
AVERAGE NUMBER OF DAYS BETWEEN INQUIRIES IS 0-90 DAYS
AVERAGE NUMBER OF DAYS BETWEEN INQUIRIES IS GREATER THAN 90 DAYS
TOTAL NUMBER OF CHECK ORDERS IN THE LAST 90 DAYS
MINIMUM NUMBER OF DAYS BETWEEN CHECK ORDERS IS 180 DAYS OR MORE
PRESENCE OF A RETAIL ITEM WITHIN THE LAST YEAR
PRESENCE OF ONE CLOSURES IN THE PAST 5 YEARS
NO RETAIL ITEMS IN THE PAST 3 YEARS

The financial institution also provides a list of credit policy exclusions and credit review guidelines. The exclusions and guidelines may be chosen by the financial institution from the list below in any number and in any combination.

TOTAL NUMBER OF TRADES
TOTAL NUMBER OF TRADES PRESENTLY CURRENT REPORTED WITHIN 6 MONTHS OF PROFILE DATE
TOTAL NUMBER OF TRADES EVER 30 OR MORE DAYS DELINQUENT OR DEROGATORY
TOTAL NUMBER OF TRADES EVER 60 OR MORE DAYS DELINQUENT OR DEROGATORY
WORST STATUS EVER ON TRADES OPENED WITHIN 36 MONTHS OF PROFILE DATE
WORST PRESENT STATUS ON OPEN TRADES OPENED WITHIN 24 MONTHS OF PROFILE DATE
AVERAGE AGE, IN MONTHS, OF ALL TRADES
MONTHS SINCE MOST RECENT SATISFACTORY STATUS ON ANY TRADE OPENED MORE THAN 6 MONTHS
MONTHS SINCE MOST RECENT 90 OR MORE-DAYS DELINQUENCY OR DEROGATORY ITEM ON ANY TRADE
TOTAL NUMBER OF INQUIRIES FOR CREDIT PURPOSES MADE WITHIN 12 MONTHS OF PROFILE DATE
PERCENT OF PROFILE CONSISTING OF TRADES 30 OR MORE DAYS DELINQUENT OR DEROGATORY

PERCENT OF PROFILE CONSISTING OF TRADES 60 OR MORE DAYS DELINQUENT OR DEROGATORY

TOTAL NUMBER OF OPEN, PAID, OR CLOSED BANKCARD TRADES

TOTAL NUMBER OF OPEN, PAID, CLOSED, OR INACTIVE BANKCARD TRADES

TOTAL NUMBER OF BANKCARD TRADES NEVER REPORTED DELINQUENT OR DEROGATORY

AVERAGE AGE, IN MONTHS, OF ALL BANKCARD TRADES

PERCENT OF PROFILE CONSISTING OF BANKCARD TRADES NEVER REPORTED DELINQUENT OR DEROGATORY

TOTAL NUMBER OF FINANCE INSTALLMENT TRADES OPENED WITHIN 12 MONTHS OF PROFILE DATE

TOTAL NUMBER OF INSTALLMENT TRADES OPENED WITHIN 12 MONTHS OF PROFILE DATE

TOTAL NUMBER OF INSTALLMENT TRADES PRESENTLY 30 OR MORE DAYS DELINQUENT OR DEROGATORY

TOTAL NUMBER OF OPEN, PAID, CLOSED, OR INACTIVE REVOLVING TRADES

TOTAL NUMBER OF OPEN REVOLVING TRADES

WORST STATUS EVER ON REVOLVING TRADES OPENED WITHIN 36 MONTHS OF PROFILE DATE

WORST PRESENT STATUS ON OPEN REVOLVING TRADE

OVERALL BALANCE/LIMIT RATIO ON ALL OPEN RETAIL REVOLVING TRADES OPENED WITHIN 12 MONTHS OF PROFILE DATE

APPLICANT AGE CALCULATED AT BUREAU

TOTAL NUMBER OF OPEN/CLOSED TRADES WITH DELINQUENT BALANCES OR AMOUNTS PAST DUE REPORTED WITHIN 12 MONTHS OF PROFILE DATE

TOTAL NUMBER OF BANKRUPTCY TRADELINES EVER

TOTAL NUMBER OF DEROGATORY PUBLIC RECORDS WHERE AMOUNT IS GREATER THAN $250

TOTAL NUMBER OF BANKRUPTCY PUBLIC RECORDS

TOTAL OUTSTANDING BALANCE ON ALL OPEN TRADES

TOTAL OF CREDIT LIMIT ON ALL OPEN TRADES

OVERALL BALANCE/LIMIT RATION ON ALL OPEN TRADES REPORTED WITHIN 6 MONTHS OF PROFILE DATE

AGE, IN MONTHS, OF OLDEST TRADE

TOTAL OUTSTANDING BALANCE ON ALL OPEN AUTO TRADES

WORST STATUS EVER ON AN AUTO TRADE

TOTAL NUMBER OF OPEN BANKCARD TRADES

TOTAL OUTSTANDING BALANCE ON ALL OPEN BANKCARD TRADES

TOTAL CREDIT LIMIT ON ALL OPEN BANKCARD TRADES

OVERALL BALANCE/LIMIT RATIO ON ALL OPEN BANKCARD TRADES REPORTED WITHIN 6 MONTHS OF PROFILE DATE

TOTAL OUTSTANDING BALANCE ON ALL OPEN REVOLVING TRADES

TOTAL CREDIT LIMIT ON ALL OPEN REVOLVING TRADES

OVERALL BALANCE/LIMIT RATIO ON ALL OPEN REVOLVING TRADES REPORTED WITHIN 6 MONTHS OF PROFILE DATE

CREATE YOUR OWN CREDIT ATTRIBUTES USING BUREAU DATA

ANY SCORE AVAILABLE AT YOUR BUREAU OF CHOICE, FOR EXAMPLE, FICO SCORE, MDS BANKRUPTCY SCORE, BEACON SCORE, ETC.

TOTAL NUMBER OF TRADES

TOTAL NUMBER OF TRADES PRESENTLY CURRENT REPORTED WITHIN 6 MONTHS OF PROFILE DATE

TOTAL NUMBER OF TRADES EVER 30 OR MORE DAYS DELINQUENT OR DEROGATORY

TOTAL NUMBER OF TRADES EVER 60 OR MORE DAYS DELINQUENT OR DEROGATORY

WORST STATUS EVER ON TRADES OPENED WITHIN 36 MONTHS OF PROFILE DATE

WORST PRESENT STATUS ON OPEN TRADES OPENED WITHIN 24 MONTHS OF PROFILE DATE

AVERAGE AGE, IN MONTHS, OF ALL TRADES

MONTHS SINCE MOST RECENT SATISFACTORY STATUS ON ANY TRADE OPENED MORE THAN 6 MONTHS

MONTHS SINCE MOST RECENT 90 OR MORE DAYS DELINQUENCY OR DEROGATORY ITEM ON ANY TRADE

TOTAL NUMBER OF INQUIRIES FOR CREDIT PURPOSES MADE WITHIN 12 MONTHS OF PROFILE DATE

PERCENT OF PROFILE CONSISTING OF TRADES 30 OR MORE DAYS DELINQUENT OR DEROGATORY

PERCENT OF PROFILE CONSISTING OF TRADES 60 OR MORE DAYS DELINQUENT OR DEROGATORY

TOTAL NUMBER OF OPEN, PAID, OR CLOSED BANKCARD TRADES

TOTAL NUMBER OF OPEN, PAID, CLOSED, OR INACTIVE BANKCARD TRADES

TOTAL NUMBER OF BANKCARD TRADES NEVER REPORTED DELINQUENT OR DEROGATORY

AVERAGE AGE, IN MONTHS, OF ALL BANKCARD TRADES

PERCENT OF PROFILE CONSISTING OF BANKCARD TRADES NEVER REPORTED DELINQUENT OR DEROGATORY

TOTAL NUMBER OF FINANCE INSTALLMENT TRADES OPENED WITHIN 12 MONTHS OF PROFILE DATE

TOTAL NUMBER OF INSTALLMENT TRADES OPENED WITHIN 12 MONTHS OF PROFILE DATE

TOTAL NUMBER OF INSTALLMENT TRADES PRESENTLY 30 OR MORE DAY DELINQUENT OR DEROGATORY

TOTAL NUMBER OF OPEN, PAID, CLOSED, OR INACTIVE REVOLVING TRADES

TOTAL NUMBER OF OPEN REVOLVING TRADES

WORST STATUS EVER ON REVOLVING TRADES OPENED WITHIN 36 MONTHS OF PROFILE DATE

WORST PRESENT STATUS ON OPEN REVOLVING TRADE

OVERALL BALANCE/LIMIT RATIO ON ALL OPEN RETAIL REVOLVING TRADES OPENED WITHIN 12 MONTHS OF PROFILE DATE

APPLICANT AGE CALCULATED AT BUREAU

TOTAL NUMBER OF OPEN/CLOSED TRADES WITH DELINQUENT BALANCES OR AMOUNTS PAST DUE REPORTED WITHIN 12 MONTHS OF PROFILE DATE

TOTAL NUMBER OF BANKRUPTCY TRADELINES EVER

TOTAL NUMBER OF DEROGATORY PUBLIC RECORDS WHERE AMOUNT IS GREATER THAN $250

TOTAL NUMBER OF BANKRUPTCY PUBLIC RECORDS

TOTAL OUTSTANDING BALANCE ON ALL OPEN TRADES

TOTAL OF CREDIT LIMIT ON ALL OPEN TRADES

OVERALL BALANCE/LIMIT RATIO ON ALL OPEN TRADES REPORTED WITHIN 6 MONTHS OF PROFILE DATE

AGE, IN MONTHS, OF OLDEST TRADE

TOTAL OUTSTANDING BALANCE ON ALL OPEN AUTO TRADES

WORST STATUS EVER ON AN AUTO TRADE

TOTAL NUMBER OF OPEN BANKCARD TRADES

TOTAL OUTSTANDING BALANCE ON ALL OPEN BANKCARD TRADES

TOTAL CREDIT LIMIT ON ALL OPEN BANKCARD TRADES

OVERALL BALANCE/LIMIT RATIO ON ALL OPEN BANKCARD TRADES REPORTED WITHIN 6 MONTHS OF PROFILE DATE

TOTAL OUTSTANDING BALANCE ON ALL OPEN REVOLVING TRADES

TOTAL CREDIT LIMIT ON ALL OPEN REVOLVING TRADES

OVERALL BALANCE/LIMIT RATIO ON ALL OPEN REVOLVING TRADES REPORTED WITHIN 6 MONTHS OF PROFILE DATE

CREATE YOUR OWN CREDIT ATTRIBUTES USING BUREAU DATA

ANY SCORE AVAILABLE AT YOUR BUREAU OF CHOICE, FOR EXAMPLE, FICO SCORE, MDS BANKRUPTCY SCORE, BEACON SCORE, ETC.

Additionally, if the financial institution 48 is interested in cross-selling products and services to a financial account applicant, the financial institution 48 also provides a list of such products and services, as well as a list of guidelines for evaluating which applicants are provided the opportunity to participate in those products and services. The security code, policy rules, evaluation guidelines, credit policy exclusions, credit review guidelines, and cross-selling products and services are all stored in the customer set up module 26.

When the financial institution 48 has an applicant that it wishes the network 10 to evaluate, the financial institution 48 logs on to the network 10 and enters its security code, along with the applicant's last name, first name, social security number, and place of residence for the last five years. The gateway server 14 immediately contacts the preliminary search database 18 which searches for information relating to financial accounts that have been closed "for cause" or for information indicating that a large number of applications have been submitted by applicant over a given period of time. The preliminary database search is used to quickly eliminate high-risk applicants. If the preliminary database search returns a "hit" relevant to the applicant, then the evaluation process is immediately terminated. If there are no "hits," the gateway server 14 passes the applicant information to the application server 22 which begins to electronically poll the modules in an attempt to amass the financial account information, demographic information, and credit bureau information that is necessary to perform the automatic evaluation of the applicant.

The application server 22 receives the applicant information from the gateway server 14, conducts a consumer search to search for links to data collections for the applicant, searches the operational data store module, searches for demographic data, and credit bureau data and transmits all of the data to the scoring model module 44 where the score or series of scores are generated. All of the data searches may be conducted using either exact matching logic or fuzzy logic, or both.

The risk model consists of three "scorecards." The scorecards are based on the availability of information. Scorecard 1 is for those inquiries in which only credit information is available. Similarly, scorecard 2 is for inquiries in which only debit bureau information is available. Scorecard 3 is for inquiries in which both credit and debit bureau information is present. The following table outlines the data (along with corresponding variable names) required to create the segmentation logic necessary for developing the "scorecards."

| FIELD NAME | LABEL |
|---|---|
| IV1 | IV: # OF INQS LAST 0-1 |
| IV365 | IV: # OF INQS LAST 2-365 |
| CPCOR365 | CP: # OF CHECK ORDERS LAST 365 DAYS |
| CPDOR365 | CP: # OF DEPOSIT ORDERS LAST 365 DAYS |
| CPOOR365 | CP: # OF OTHER ORDERS LAST 365 DAYS |
| SCAN999 | # ALL LAST 3 YEARS |
| CVD0001S | CV: # OF HISTORIC CLOSURES PREVIOUS DAY |
| CVD0007S | CV: # OF HISTORIC CLOSURES 2-7 DAYS |
| CVD0014S | CV: # OF HISTORIC CLOSURES 8-14 DAYS |
| CVD0030S | CV: # OF HISTORIC CLOSURES 15-30 DAYS |
| CVD0060S | CV: # OF HISTORIC CLOSURES 31-60 DAYS |
| CVD0090S | CV: # OF HISTORIC CLOSURES 61-90 DAYS |
| CVD0180S | CV: # OF HISTORIC CLOSURES 91-180 DAYS |
| CVD0365S | CV: # OF HISTORIC CLOSURES 181-365 DAYS |
| CVD0730S | CV: # OF HISTORIC CLOSURES 366-730 DAYS |
| CVD1095S | CV: # OF HISTORIC CLOSURES 731-1095 DAYS |
| CVD1460S | CV: # OF HISTORIC CLOSURES 1096-1460 DAYS |
| CVD1825S | CV: # OF HISTORIC CLOSURES 1461-1825 DAYS |
| GBL007 | CREDIT: DECEASED FLAG |
| ALL001 | CREDIT: TOTAL NUMBER OF OPEN, PAID, OR CLOSED TRADES |

In order to implement the segmentation logic, the following intermediate variables are created.

| | |
|---|---|
| VARIABLE: | SUMCLS |
| DESCRIPTION: | Presence of closure in the last 1825 days |
| LOGIC: | IF (CVD0001S > 0 OR CVD0007S > 0 OR CVD0014S > 0 OR CVD0030S > 0 OR CVD0060S > 0 OR CVD0090S > 0 OR CVD0180S > 0 OR CVD0365S > 0 OR CVD0730S > 0 OR CVD1095S > 0 OR CVD1460S > 0 OR CVD1825S > 0) THEN SUMCLS = 1 ELSE SUMCLS = 0 |
| VARIABLE: | SUMSCAN |
| DESCRIPTION: | Presence of scan activity in the last 3 years |
| LOGIC: | IF SCAN999 > 0 THEN SUMSCAN = 1 ELSE SUMSCAN = 0 |
| VARIABLE: | DEBIT001 |
| DESCRIPTION: | Presence of Debit Bureau information |
| LOGIC: | IF (SUMCLS > 0 OR SUMSCAN > 0 OR IV1 > 0 OR IV365 > 0 OR CPCOR365 > 0 OR CPDOR365 > 0 OR CPOOR365 > 0) THEN DEBIT001 = 1 ELSE DEBIT001 = 0 |

| VARIABLE: | GBL007 |
|---|---|
| DESCRIPTION: | Deceased indicator |
| SOURCE: | Credit reporting bureau database |
| VARIABLE: | ALL001 |
| DESCRIPTION: | Total number of open, paid, or closed trades |

Once the intermediate variables have been computed, the segmentation logic is created as follows:
IF GBL007=1 THEN SEGMENT=−1
ELSE IF ALL001=0 AND DEBIT001=0 THEN SEGMENT=0
ELSE IF ALL001>0 AND DEBIT001=0 THEN SEGMENT=1
ELSE IF ALL001=0 AND DEBIT001>0 THEN SEGMENT=2
ELSE IF ALL001>0 AND DEBIT001>0 THEN SEGMENT=3

Segment values have the following meanings:
−1=Deceased
0=No debit or credit information
1=Credit Bureau information only
2=Debit Bureau information only
3=Credit and Debit Bureau information For scorecard 1 (credit bureau data only), the attributes required in the scorecard are as follows:

| Name | Label | Description |
|---|---|---|
| ALL001 | TTL TRADE | Total number of open, paid, or closed trades |
| ALL078 | TTL DEL-GE60 | Total number of trades ever 60 or more days delinquent or derogatory |
| ALL504 | WORST-EVER-OPEN36 | Worst status ever on trades opened within 36 months of the profile date |
| ALL602 | WORST-NOW OPEN OPEN24 | Worst present status on open trades opened within 24 months of the profile date |
| ALL710 | AGE-RECENT-SAT OPEN > 6 | Months since most recent satisfactory status on any trade opened more than 6 months |
| ALL740 | AGE-RECENT-GE90 | Months since most recent 90 or more days delinquency or derogatory item on any trade |
| ALL804 | TTL INQ12 | Total number of inquiries for credit purposes made within 12 months of the profile date |
| ALL904 | PERCENT 60+ (OPC) | Percent of profile consisting of trades 60 or more days delinquent or derogatory |
| BAC001 | TTL TRADE BNKCARD | Total number of open, paid, or closed bankcard trades |
| BAC002 | TTL TRADE-OPCI BNKCARD | Total number of open, paid, closed, or inactive bankcard trades |
| BAC071 | TTL SAT BNKCARD | Total number of bankcard trades never reported delinquent or derogatory |
| BAC703 | AVG-AGE BNKCARD | Average age, in months, of all bankcard trades |
| BAC901 | PERCENT NEVER DEL- OR-DEROG BNKCARD | Percent of profile consisting of bankcard trades never reported delinquent or derogatory |
| FIL022 | TTL OPEN12 FINANCE INSTALL | Total number of finance installment trades opened within 12 months of the profile date |
| ILN064 | TTL PRESENT-GE30 INSTALL | Total number of installment trades presently 30 or more days delinquent or derogatory |
| REV002 | TTL TRADE-OPCI REV | Total number of open, paid, closed, or inactive revolving trades |
| REV003 | TTL TRADE OPEN REV | Total number of open revolving trades |
| REV504 | WORST-EVER-OPEN36 REV | Worst status ever on revolving trades opened within 36 months of the profile date |
| REV601 | WORST-NOW OPEN REV | Worst present status on an open revolving trade |
| RTR404 | BTL OPEN BAL OPEN12 RETAIL REV | Overall balance/limit ratio on all open retail revolving trades opened within 12 months of the profile date |

To derive the "credit data only scorecard," the algorithm establishes attribute caps as follows:
BAC703=MIN(BAC703, 240);
ILN064=MIN(ILN064, 20);
RTR404=MIN(RTR404, 110);
ALL804=MIN(ALL804, 20);
FIL022=MIN(FIL022, 5).

The logical function "MIN" indicates that the lesser of the two operators is transferred into the variable. The attributes and attribute caps are converted using the following mathematical functions:
SRBAC703=SQRT(BAC703);
ALL504B=(ALL504>1);
ALL710A=(ALL710<=12);
LNILN064=LOG(ILN064+1);
REV601A=REV601=1;
REV504F=REV504>120;
SRALL804=SQRT(ALL804);
ALL602B=ALL602>1;
ALL740B=(ALL740<=12);
LNFIL022=LOG(FIL022+1).

"SQRT" indicates the mathematical square root transformation, while "LOG" indicates the natural logarithm transformation. Additionally, the algorithm establishes or identifies false zero relationships using the following logical statement:

IF REV504F=0 AND REV002=0 THEN
    REV504F=1.

The scoring algorithm then calculates the score.

$$SCOR = +2.20169 - (0.00946328 * ALL904) +$$
$$(0.07616756 * SRBAC703) - (0.39115484 * ALL504B) +$$
$$(0.24159381 * ALL710A) - (0.20654182 * LNILN064) +$$
$$(0.19162188 * REV601A) - (0.00599192 * RTR404) -$$
$$(0.04240944 * REV504F) + (0.0055761 * BAC901) -$$
$$(0.19366108 * SRALL804) - (0.17019613 * ALL602B) -$$
$$(0.16300223 * ALL740B) - (0.28859933 * LNFIL022).$$

The above algorithm outputs the variable SCOR, which is taken into the following scaling equation.
Final Score=100+799/(1+exp(−SCOR))**4, rounded to the nearest integer value.
The table below represents the scoring algorithm for the credit data only scorecard.

| SCORING VARIABLE | | COEFFICIENT |
|---|---|---|
| CONSTANT | CONSTANT IS TO BE ADDED AUTOMATICALLY TO EACH APPLICANT'S SCORE | 2.20169 |
| ALL904 | Multiply by the coefficient | −0.00946328 |
| SRBAC703 | Multiply by the coefficient | 0.07616756 |
| ALL504B | Multiply by the coefficient | −0.39115484 |
| ALL710A | Multiply by the coefficient | 0.24159381 |
| LNILN064 | Multiply by the coefficient | −0.20654182 |
| REV601A | Multiply by the coefficient | 0.19162188 |
| RTR404 | Multiply by the coefficient | −0.00599192 |
| REV504F | Multiply by the coefficient | −0.04240944 |
| BAC901 | Multiply by the coefficient | 0.0055761 |
| SRALL804 | Multiply by the coefficient | −0.19366108 |
| ALL602B | Multiply by the coefficient | −0.17019613 |
| ALL740B | Multiply by the coefficient | −0.16300223 |
| LNFIL022 | Multiply by the coefficient | −0.28859933 |

For scorecard 2 (debit bureau data only), the attributes required in the scorecard are as follows.

| Name | Label | Description |
|---|---|---|
| SCON999 | SC: # OPEN LAST 3 YEARS | Total number of open scan items over the past three years |
| CPUNABA | # DIFFERENT BANKS | Total number of check orders from different financial institutions |
| IV365 | IV: # OF INQS LAST 2-365 | Total number of inquiries 2 to 365 days ago |
| SCAN999 | SC: # ALL LAST 3 YEARS | Total number of scan items over the past three years |
| CVT0180S | CV: # OF CLOSURES AT 2-180 DAYS | Total number of closures 2 to 180 days ago |
| CVD0365S | CV: # OF HISTORIC CLOSURES 181-365 DAYS | Total number of closures 181 to 365 days ago |
| CVD0730S | CV: # OF HISTORIC CLOSURES 366-730 DAYS | Total number of closures 366 to 730 days ago |
| CVD1095S | CV: # OF HISTORIC CLOSURES 731-1095 DAYS | Total number of closures 731 to 1095 days ago |
| CVD1460S | CV: # OF HISTORIC CLOSURES 1096-1460 DAYS | Total number of closures 1096 to 1460 days ago |
| CVD1825S | CV: # OF HISTORIC CLOSURES 1461-1825 DAYS | Total number of closures 1461 to 1825 days ago |
| IVFI180 | IV: # OF INQS DIFF FI LAST 2-180 | Total number of inquiries from different financial institutions 2 to 180 days ago |
| IVDBTWN | IV: AVG. DAYS BETWEEN INQUIRIES | Average number of days between inquiries |
| CPCORD90 | CP: # OF CHECK ORDERS LAST 90 DAYS | Total number of check orders in the last 90 days |
| CPMNBETW | CP: MIN DAYS BETWEEN CHECK ORDERS | Minimum number of days between check orders |
| SCALAST | SC: DAYS SINCE LAST ALL ITEMS | Number of days since last scan item |

Again, to implement the segmentation logic, the following variables are created.

| VARIABLE: | SCON999B |
|---|---|
| DESCRIPTION: | SCP: # ALL LAST 3 YEARS ≥ 1 |
| LOGIC: | IF (SCON999 ≥ 1) THEN SCON999B = 1 |
| | ELSE SCON999B=0 |
| VARIABLE: | CPUNABAB |
| DESCRIPTION: | CP: # OF DIFFERENT BANKS 1-2 |
| LOGIC: | IF (CPUNABA ≥ 1 AND CPUNABA ≤ 2) THEN CPUNABAB = 1 |
| | ELSE CPUNABAB = 0 |
| VARIABLE: | SCAN999B, SCAN999C, SCAN999D |

| | | |
|---|---|---|
| DESCRIPTION: | SCA: # ALL LAST 3 YEARS: 1 | |
| | SCA: # ALL LAST 3 YEARS: 2-3 | |
| | SCA: # ALL LAST 3 YEARS: 4+ | |
| LOGIC: | SCAN999B = 0 | |
| | SCAN999C = 0 | |
| | SCAN999D = 0 | |
| | IF SCAN999 = 1 THEN SCAN999B = 1 | |
| | ELSE IF (SCAN999 ≥ 2 AND SCAN999 ≤ 3) THEN SCAN999C = 1 | |
| | ELSE IF (SCAN999 ≥ 4) THEN SCAN999D = 1 | |
| VARIABLE: | CVD0365A | |
| DESCRIPTION: | CLOSURE: 181-1825 DAYS | |
| LOGIC: | IF (CVD0365S = 1 OR CVD0730S = 1 OR CVD1095S = 1 OR CVD1460S = 1 OR CVD1825S =1) THEN CVD0365A =1 | |
| | ELSE CVD0365A = 0 | |
| VARIABLE: | IVDBTWNA, IVDBTWNB | |
| DESCRIPTION: | IV: AVG. DAYS BETWEEN INQUIRIES: 0-90 | |
| | IV: AVG. DAYS BETWEEN INQUIRIES: 90+ | |
| LOGIC: | IVDBTWNA = 0 | |
| | IVDBTWNB = 0 | |
| | IF (IVDBTWN ≥ 0 AND IVDBTWN ≤ 90) THEN IVDBTWNA = 1 | |
| | ELSE IF (IVDBTWN ≥ 91) THEN IVDBTWNB = 1 | |
| VARIABLE: | CPMNBETD | |
| DESCRIPTION: | CP: MIN DAYS BETWEEN CHECK ORDERS: 180+ | |
| LOGIC: | IF (CPMNBETW ≥ 180) THEN CPMNBETD = 1 | |
| | ELSE CPMNBETD = 0 | |
| VARIABLE: | SCALASTB | |
| DESCRIPTION: | SCA: DAYS SINCE LAST ALL ITEM: 0-356 DAYS | |
| LOGIC: | IF (SCALAST ≥ 0 AND SCALAST ≤ 365) THEN SCALASTB = 1 | |
| | ELSE SCALASTB = 0 | |
| VARIABLE: | QCPCOR90 | |
| DESCRIPTION: | CP: # CHECK ORDERS LAST 90 DAYS-SQRT | |
| LOGIC: | SQRT(CPCORD90) | |

The table below represents the scoring algorithm for the debit data only scorecard.

| SCORING VARIABLE | | POINTS |
|---|---|---|
| CONSTANT | CONSTANT IS TO BE ADDED AUTOMATICALLY TO EACH APPLICANT'S SCORE | 1.5919 |
| | 0 | 0 |
| SCON999B | 1 OR MORE | -.6233 |
| IV365 | Multiply by the coefficient | -.1537 |
| | 0 | 0 |
| CPUNABAB | 1 TO 2 | .6526 |
| | 3 OR MORE | 0 |
| | 0 | 0 |
| SCAN999B | 1 | -.5349 |
| SCAN999C | 2 TO 3 | -.6632 |
| SCAN999D | 4 OR MORE | -.7182 |
| CVT0180S | Multiply by the coefficient | -.6266 |
| CVD0365A | PREVIOUS DAY TO 180 | 0 |
| | 181 OR MORE | -.4825 |
| IVFI180 | Multiply by the coefficient | -.1498 |
| | . | 0 |
| IVDBTWNA | 0 TO 90 | -.2234 |
| IVDBTWNB | 91 OR MORE | -.1215 |
| QCPCOR90 | Multiply by the coefficient | -.3047 |
| CPMNBETD | . | 0 |
| | 0 TO 179 | 0 |
| | 180 OR MORE | .5656 |
| | . | 0 |
| | 0 | 0 |
| SCALASTB | 1 TO 365 | -.2051 |
| | 366 OR MORE | 0 |

A period ('.') denotes a missing value for a particular attribute. The algorithm outputs the variable SCOR, which is taken into the following scaling equation.

$$\text{Final Score} = 100 + 799/(1+\exp(-SCOR))^{**}4, \text{ rounded to the nearest integer value.}$$

For scorecard 3 (credit and debit bureau), the attributes required in the scorecard are as follows:

| Name | Label | Description |
|---|---|---|
| ALL001 | TTL TRADE | Total number of open, paid, or closed trades |
| ALL062 | TTL PRESENT-SAT RPTED6 | Total number of trades presently current reported within 6 months of the profile date |
| ALL075 | TTL DEL-GE30 | Total number of trades ever 30 or more days delinquent or derogatory |
| ALL504 | WORST-EVER-OPEN36 | Worst status ever on trades opened within 36 months of the profile date |
| ALL602 | WORST-NOW OPEN OPEN24 | Worst present status on open trades opened within 24 months of the profile date |
| ALL703 | AVG-AGE | Average age, in months, of all trades |

-continued

| Name | Label | Description |
|------|-------|-------------|
| ALL710 | AGE-RECENT-SAT OPEN>6 | Months since most recent satisfactory status on any trade opened more than 6 months |
| ALL903 | PERCENT 30+ (OPC) | Percent of profile consisting of trades 30 or more days delinquent or derogatory |
| ILN022 | TTL OPEN12 INSTALL | Total number of installment trades opened within 12 months of the profile date |
| ILN064 | TTL PRESENT-GE30 INSTALL | Total number of installment trades presently 30 or more days delinquent or derogatory |
| REV002 | TTL TRADE-OPCI REV | Total number of open, paid, closed, or inactive revolving trades |
| REV504 | WORST-EVER-OPEN36 REV | Worst status ever on revolving trades opened within 36 months of the profile date |
| CVT1825S | CV: # OF HISTORIC CLOSURES 2-1825 DAYS | Total number of closures 2 to 1825 days ago |
| IV365 | IV: # OF INQS LAST 2-365 | Total number of inquiries 2 to 365 days ago |
| SCAN999 | # ALL LAST 3 YEARS | Total number of scan items over the past three years |
| SCON999 | # OPEN LAST 3 YEARS | Total number of open scan items over the past three years |

To derive the credit and debit combined scorecard, the algorithm establishes the attributes as follows:
ALL703=MIN(ALL703,240);
ILN064=MIN(ILN064,25);
IV365=MIN(IV365,10);
ALL062=MIN(ALL062, 25);
ILN022=MIN(ILN022, 10).

The attributes and attribute caps are converted using the following mathematical functions:
LNALL703=LOG(ALL703+1);
SCAN999A=SCAN999=0;
SRALL903=SQRT(ALL903);
LNILN064=LOG(ILN064+1);
SRIV365=SQRT(IV365);
ALL504D=ALL504>60;
ALL710B=(ALL710<=24);
SCON999A=(SCON999=0);
REV504F=REV504>120;
ALL602B=ALL602>1.

Additionally, the algorithm establishes or identifies false zero relationships using the following algorithm:

IF REV504F=0 AND REV002=0 THEN
   REV504F=1.

The scoring algorithm then calculates the score.

$$SCOR = +0.83475 + (0.38888396 * LNALL703) +$$
$$(0.52751826 * SCAN999A) - (0.15296523 * SRALL903) -$$
$$(0.21593754 * LNILN064) - (0.28475832 * SRIV365) -$$
$$(0.12155948 * ALL504D) + (0.10062759 * ALL710B) +$$
$$(0.18870077 * SCON999A) - (0.25754947 * CVT1825S) +$$
$$(0.04657684 * ALL062) - (0.06580746 * ILN022) -$$
$$(0.12498866 * REV504F) - (0.27472889 * ALL602B).$$

The above algorithm outputs the variable SCOR, which is taken into the following scaling equation.

Final Score=100+799/(1+exp(-SCOR))**4, rounded to the nearest integer value. The table below represents the scoring algorithm for the blended scorecard.

| SCORING VARIABLE | | COEFFICIENT |
|------|------|------|
| CONSTANT | CONSTANT IS TO BE ADDED AUTOMATICALLY TO EACH APPLICANT'S SCORE | 0.83475 |
| LNALL703 | Multiply by the coefficient | 0.38888396 |
| SCAN999A | Multiply by the coefficient | 0.52751826 |
| SRALL903 | Multiply by the coefficient | −0.15296523 |
| LNILN064 | Multiply by the coefficient | −0.21593754 |
| SRIV365 | Multiply by the coefficient | −0.28475832 |
| ALL504D | Multiply by the coefficient | −0.12155948 |
| ALL710B | Multiply by the coefficient | 0.10062759 |
| SCON999A | Multiply by the coefficient | 0.18870077 |
| CVT1825S | Multiply by the coefficient | −0.25754947 |
| ALL062 | Multiply by the coefficient | 0.04657684 |
| ILN022 | Multiply by the coefficient | −0.06580746 |
| REV504F | Multiply by the coefficient | −0.12498866 |
| ALL602B | Multiply by the coefficient | −0.27472889 |

The score or scores are sent back to the application server 22 where they are compared with the policy rules and guidelines of the financial institution to either accept or deny the financial account application.

In a preferred embodiment, a range is set for the scores so that: if the score is below the financial institution's "deny limit," a "deny applicant" code is returned to the financial institution; if the score is above the financial institution's "accept limit," an "accept applicant" code is returned to the financial institution; and if the score is between the "deny limit" and the "accept limit," then a "review" code is returned to the financial institution. If a "review" code is generated, the financial institution may wish to examine the application or applicant in greater detail. If the application is accepted, then the score or scores are compared to the financial institution's cross-selling guidelines to determine whether and what products and services of the financial institution should be offered to the applicant. An electronic report is sent to the financial institution advising the institution of the results of the evaluation.

Figure 2:
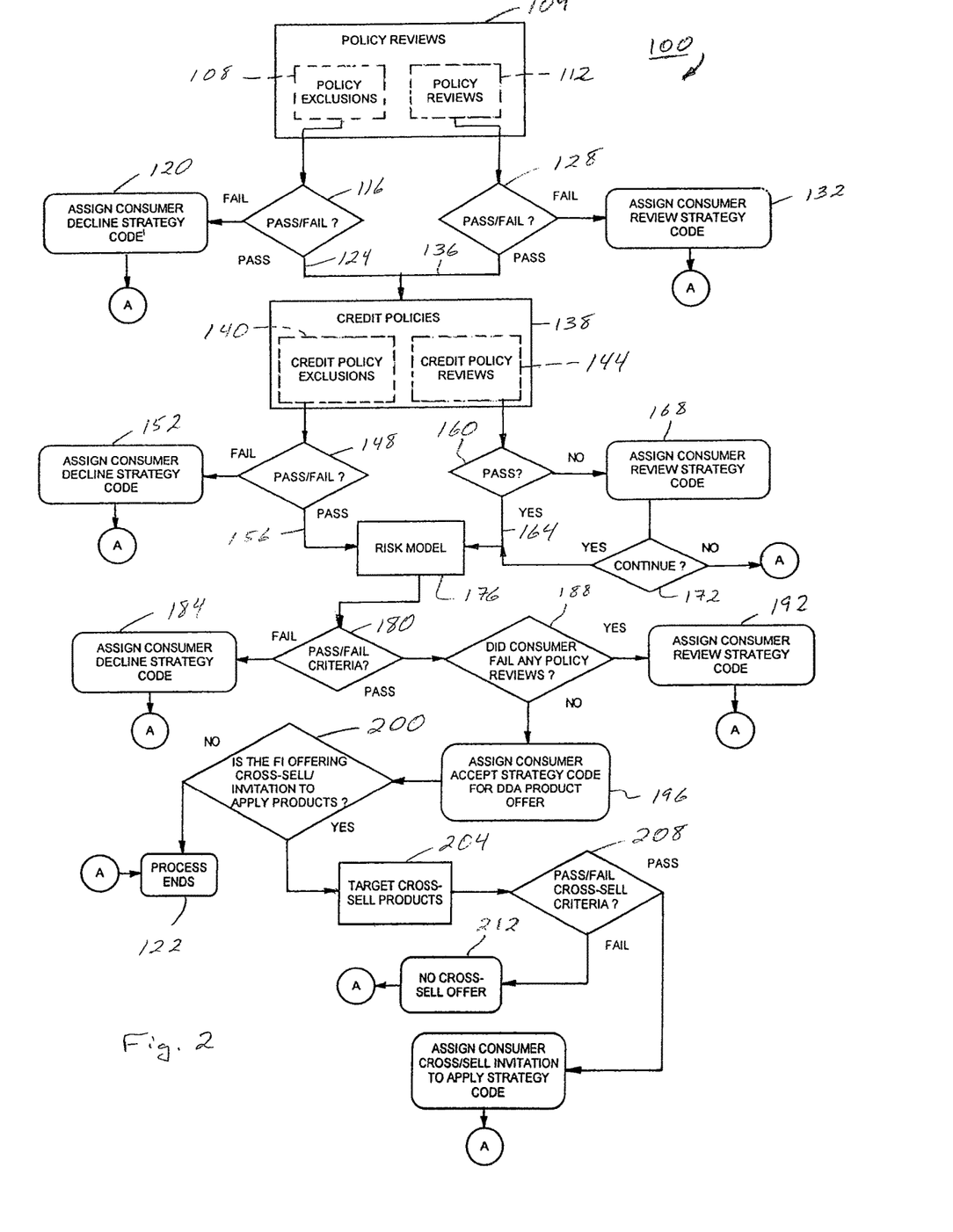
FIG. 2 is a flow chart illustrating the decisioning process of the network shown in FIG. 1.

FIG. 2 is a flowchart illustrating the decisioning process 100 of the network 10 shown in FIG. 1. The information acquired by the application server 22 is compared 104 against the policy rules (or exclusions) 108 and financial account application evaluation guidelines (or reviews) 112. If the data indicates (by comparison at 116) that the applicant does not comply with one of the policy rules, then a fail code is issued 120 to the financial institution indicating that the applicant should be denied the account and the process is terminated 122. If the rules are met then the application server 22 issues a pass code 124. At the same time that the policy rules are being evaluated against the data, the application server 22 is comparing 128 the data with the financial account application evaluation guidelines. If the data does not meet the guidelines, then a code is issued 132 to the financial institution indicating that the application should be reviewed in greater detail. If the data meets the guidelines, then a pass code is issued 136, and (provided the pass code is issued for the policy rules evaluation) the application server 22 proceeds 138 to evaluate the credit bureau data against the credit policy exclusions 140 and credit review guidelines 144 provided by the financial institution. If the applicant's data from the credit bureau indicates (by comparison at 148) a violation of the financial institution credit policy exclusions, then the application server 22 issues a code 152 to the financial institution indicating that the application should be declined and the process is terminated. Alternatively, if the credit policy exclusions are not violated by the credit bureau data, then the application server 22 continues 156 with the data evaluation process. At the same time that the credit policy exclusions are being compared with the credit bureau data, the application server 22 is comparing 160 the credit review guidelines with the credit bureau data. If both the credit policy exclusions and credit review guidelines are satisfied by the credit bureau data, then the application server 22 proceeds 164 with the evaluation process. If the data does not meet the credit review guidelines, then a code is issued 168 to the financial institution indicating that the application should be reviewed in greater detail. However, even if the credit review guidelines are not satisfied, the financial institution may opt to continue 172 with the evaluation process. Alternatively, the process is terminated 122. If both the credit policy exclusions and credit review guidelines are satisfied, the application server 22 executes the scoring model (or risk model algorithm) 176 to generate the score or scores for the applicant. The score or scores is/are compared 180 against financial institution past/fail criteria. If the applicant fails, then the application server 22 issues 184 a decline code to the financial institution again indicating that the applicant should be declined and the process is terminated 122. Alternatively, if the applicant's score passes the financial institution criteria, the score is reviewed 188 to determine whether the applicant failed any policy reviews. If so, then the application server 22 issues 192 to the financial institution a code indicating that the application should be reviewed in greater detail and the process is terminated 122. If the consumer did not fail to satisfy any credit review guideline, then the application server 22 generates a code 196 indicating that the financial institution should accept the application and offer the product applied for (such as a demand deposit account (DDA)) to the applicant. Additionally, the application server 22 determines 200 whether the financial institution is offering cross-selling products and, if so, which products 204. If not, the process terminates 122. However, if the financial institution is offering cross-selling products, the applicant data and score or scores are compared 208 with the financial institution pass/fail criteria for such products. If the data and score or scores do not meet the criteria, then the application server 22 issues a fail code 212 to the financial institution indicating that no cross-selling products are to be offered to the applicant and the process terminates 122. Alternatively, if the applicant passes the criteria, the application server 22 issues a code 216 to the financial institution indicating that the product should be offered to the applicant and that the financial institution should invite the applicant to apply for that product. The process then terminates 122.

Figure 3:
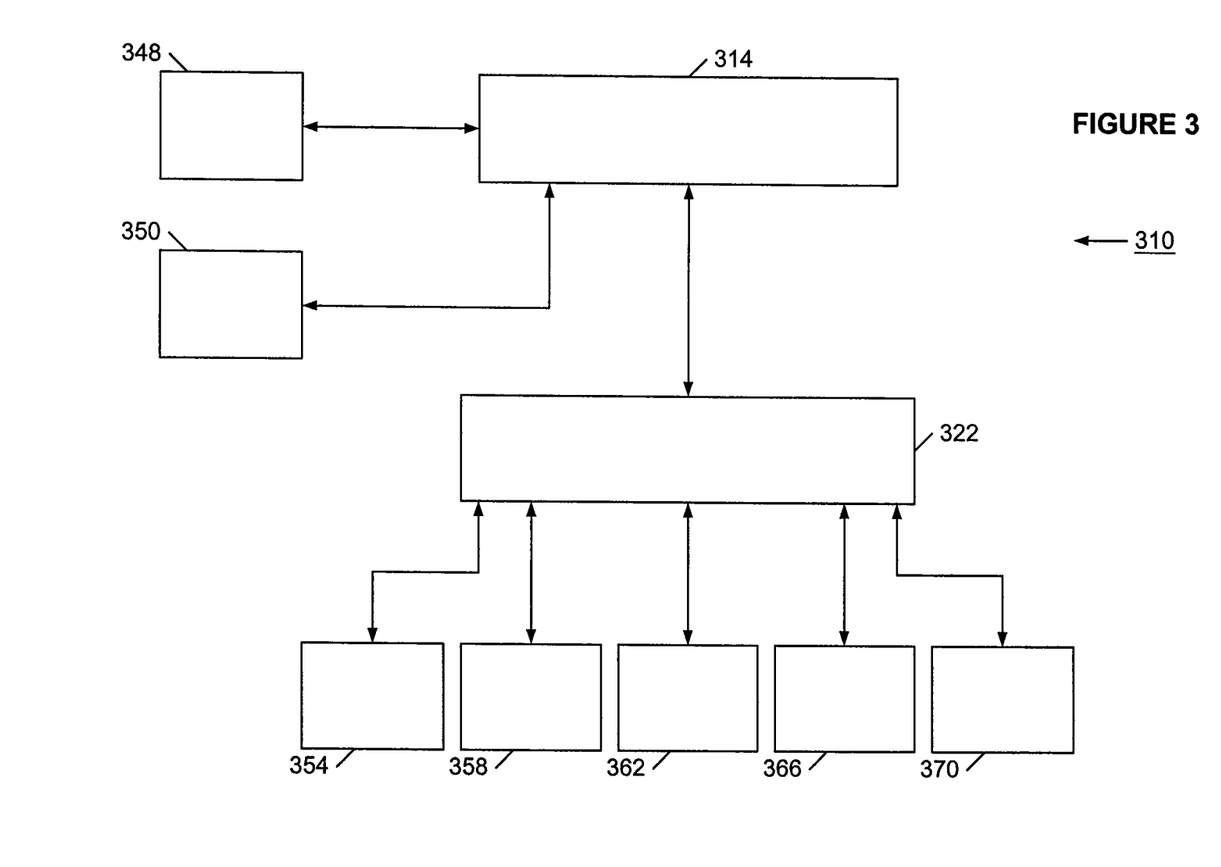
FIG. 3 is a schematic block diagram of a network.

FIG. 3 shows another embodiment of the invention. FIG. 3 shows a network 310 for cross-selling and presenting offers of products and services via an automated teller machine ("ATM") or a point-of-purchase ("POP") machine 350. While only one ATM 350 is shown in the drawing, the system is intended to be accessed by many ATMs 350. The network 314 includes a gateway server 314 through which the ATMs 350 are connected to the network. The ATMs 350 may also be connected to the gateway server 314 through a financial institution 348.

An ATM 350 is provided for users to obtain money, financial information, and other information. The information, which may be in the form of an advertisement or promotional offer, provided to the user of the ATM 350 can be personalized to the needs and interests of the user, and may include, but is not limited to account information, financial and non-financial products, and financial and non-financial services.

ATMs 350 generally have a display screen, a key pad, a card reader, a receipt printer, a cash dispenser, and a deposit slot. The card reader may be a conventional magnetic card swipe device, a fingerprint reader, eye scanner, or similar device. The ATM 350 may also include a voice synthesis device. Each user maintains an access device, e.g., bank card, credit card, ATM card, or similar identification device and a personal identification number ("PIN") or personal access number ("PAN") for access to the ATM 350.

The network 310 also includes an application server 322 connected to the gateway server 314 and a plurality of application modules 354, 358, 362, 366, and 370, connected to the application server 322. The application modules include an identification module 354, a consumer information database 358, a marketing module 362, a presentation module 366, and a tracking module 370. All connections shown in the figure denote two-way communication between the connected entities.

The identification module 354 operates to identify the person using the ATM 350 based upon information entered into the ATM 350. The consumer information database 358 contains general biographical, personal and historical information about users, their interests and past spending history. Typical information includes, but is not limited to demographic data, such as age, income, marital status, and number of children; promotional history data, such as previous promotions presented to the client; and behavioral data, such as account balances, number of products and services purchased in the past, and length of time as a client.

The marketing module 362 determines which promotional offers, messages, and/or advertisements to display to the user on the ATM 350. Each user is assigned a particular number, rule, group, segment, score, category, or class (collectively referred to as a "score") which identifies particular messages, advertisements, and promotional offers that would be appropriate to the user's needs and interests based on the information in the consumer information database 358. This process is referred to as "target marketing," by customizing information presented to the ATM user, and provides an effective and efficient technique to sell products and services and increase customer satisfaction. The score can be pre-assigned and stored in memory, for example, when the account owner applies to open the account. Alternatively, the score can be dynamically calculated (using the network 310 or other suitable means) each time the user accesses the ATM 350. More specifically, each time the user accesses the ATM 350, the gateway server 314 prompts the application server 322 to electronically poll the modules to access the information necessary to evaluate the applicant. The scores are developed for the ATM user, and the advertisement or promotional offer is then selected for that user based on the score. The advantage of calculating the score each time the user accesses the ATM 350 is that updated information is taken into account more frequently. Alternatively, the score can be recalculated only periodically, for example once every three months, or once every twenty times the user accesses the ATM 350. This would reduce processing required of the network 310.

The presentation module 366 receives information from the marketing module 362 of the particular promotional offers, messages, and/or advertisements that are to be displayed. This module 366 formats and personalizes these promotional offers, messages, and/or advertisements to the user of the ATM 350. Alternatively, non-personalized messages, advertisements, and promotional offers may be displayed. The presentation module 366 also sends the formatted messages, advertisements, and promotional offers to the ATM display for review by the user. These messages, advertisements, and promotional offers may appear on the display at any time during the transaction or after completion of the transaction.

The tracking module 370 tracks and stores responses to the promotional offers, messages, and advertisements. Occasionally, the promotional offers, messages, and advertisements may require a response from the user of the ATM 350. This module 370 captures the user's response, if any, and tracks all messages, advertisements, and promotional offers that are displayed, but do not require a response. Financial institutions 348 or other institutions may access the user response information and displayed data information for follow-up purposes, future marketing techniques, future display of messages, advertisements, and promotional offers, and for other analyses.

In operation, a user enters, scans, or swipes their card or identification device and PAN, if necessary, to begin a transaction at the ATM 350. The identification module verifies that the identification device and PAN are compatible before the user begins the transaction. The transaction may include obtaining money, obtaining account balances, depositing checks to the user's accounts, etc. Simultaneous with the transaction, the marketing module 362, based on the user's identification looks up or calculates the score of the user. Once the score is known, the marketing module 362 identifies which promotional offers, messages, and advertisements to display to the user. This information is transmitted to the presentation module 366 to personalize the promotional offers, messages, and advertisements. The presentation module 366 transmits these promotional offers, messages, and advertisements to the display of the ATM 350 during the transaction or after the transaction is completed. The tracking module 370 stores which promotional offers, messages, and advertisements are displayed and also stores the user's responses, if necessary.

Various features and advantages of the invention are set forth in the following claims.

The invention claimed is:

1. A computer-implemented method comprising:
receiving, from an automated teller machine, identification information provided by a user;
retrieving, from a database, personal or historical information relating to the user using the identification information;
determining whether the retrieved information passes account policy exclusions and credit policy exclusions;
determining whether the retrieved information passes account policy reviews and credit policy reviews, wherein the account policy exclusions and account policy reviews relate to financial activity associated with the user and the credit policy exclusions and credit policy reviews relate to trade line activity associated with the user;
based on determining whether the retrieved information passes at least one of the account policy reviews or credit policy reviews, calculating, using at least one processor, a score for the user based on at least one of the identification information, the personal information, or the historical information, the score calculation based at least in part on a risk model that predicts a likelihood that the user will abuse a financial account;
selecting, using the at least one processor, at least one of an advertisement or promotional offer associated with a financial institution based on the score; and
transmitting information identifying the selected advertisement or promotional offer for display to the user,
wherein the credit policy exclusions and credit policy reviews are provided by the financial institution;
wherein the financial institution is assigned a security code, and wherein the method further comprises receiving the security code and the identification information from the financial institution.

* * * * *